Figure 1:
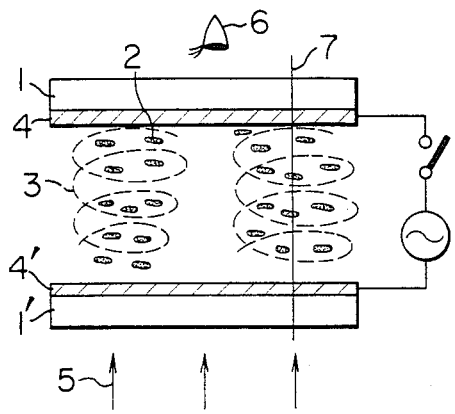

United States Patent [19]

Imazeki et al.

[11] Patent Number: 4,495,083
[45] Date of Patent: Jan. 22, 1985

[54] GUEST-HOST TYPE LIQUID CRYSTAL COMPOSITION AND LIQUID CRYSTAL DISPLAY DEVICE USING THE SAME

[75] Inventors: Shuji Imazeki; Akio Mukoh; Hirosada Morishita, all of Hitachi; Seiichi Imahori, Kawasaki; Masaharu Kaneko, Yamato; Hitoshi Ono, Yokohama, all of Japan

[73] Assignees: Hitachi, Ltd.; Mitsubishi Chemical Industries, Limited, both of Tokyo, Japan

[21] Appl. No.: 195,860

[22] Filed: Oct. 10, 1980

[30] Foreign Application Priority Data

| Oct. 12, 1979 | [JP] | Japan | 54-130785 |
| Jan. 8, 1980 | [JP] | Japan | 55-712 |
| May 28, 1980 | [JP] | Japan | 55-70152 |
| Aug. 21, 1980 | [JP] | Japan | 55-114937 |
| Sep. 8, 1980 | [JP] | Japan | 55-123571 |

[51] Int. Cl.³ .......................... C09K 3/34; C02F 1/13
[52] U.S. Cl. .................................. 252/299.1; 350/349
[58] Field of Search ...................... 252/299.1; 350/349

[56] References Cited

U.S. PATENT DOCUMENTS

| 4,358,392 | 11/1982 | Cognard et al. | 252/299.1 |
| 4,360,447 | 11/1982 | Morinaka et al. | 252/299.1 |
| 4,363,743 | 12/1982 | Moeller et al. | 252/299.1 |
| 4,376,715 | 3/1983 | Cognard et al. | 252/299.1 |

FOREIGN PATENT DOCUMENTS

| 2104 | 5/1979 | European Pat. Off. | 252/299.1 |
| 49036 | 4/1982 | European Pat. Off. | 252/299.1 |
| 2920730 | 11/1979 | Fed. Rep. of Germany | 252/299.1 |

*Primary Examiner*—Teddy S. Gron
*Attorney, Agent, or Firm*—Antonelli, Terry & Wands

[57] ABSTRACT

This invention relates to a guest-host type liquid crystal composition and a color liquid crystal display device in which said composition has been sealed. This invention provides a liquid crystal composition containing a specific anthraquinone dye as a pleochroic dye which, as the guest dye, has a degree of orderness of the alignment (order parameter) in the host liquid crystal in the range from 0.5 to 1, shows remarkable contrast between the colored state and the uncolored state, and is excellent in stability to light, heat, and the like. Further, this invention provides a color guest-host type liquid crystal display device in which said liquid crystal composition has been sealed.

17 Claims, 20 Drawing Figures

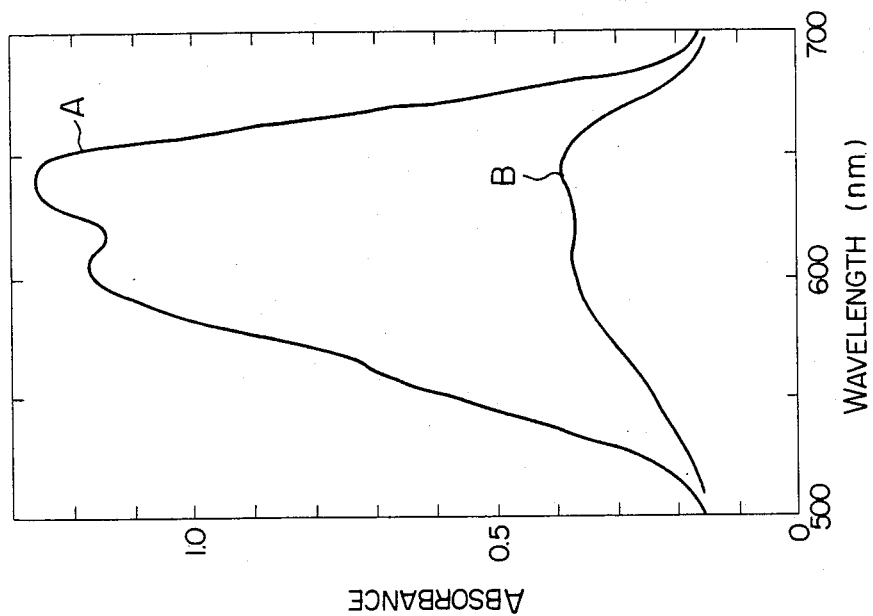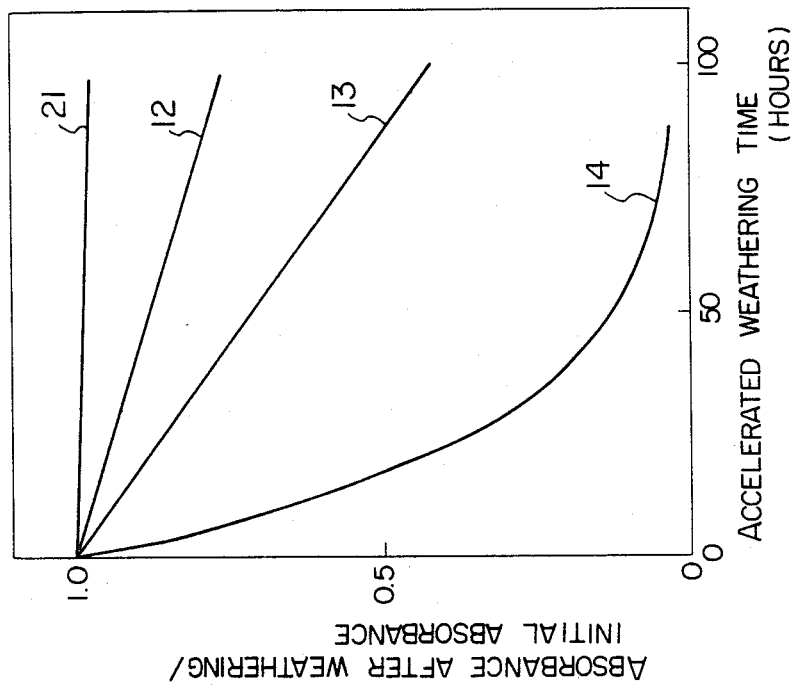

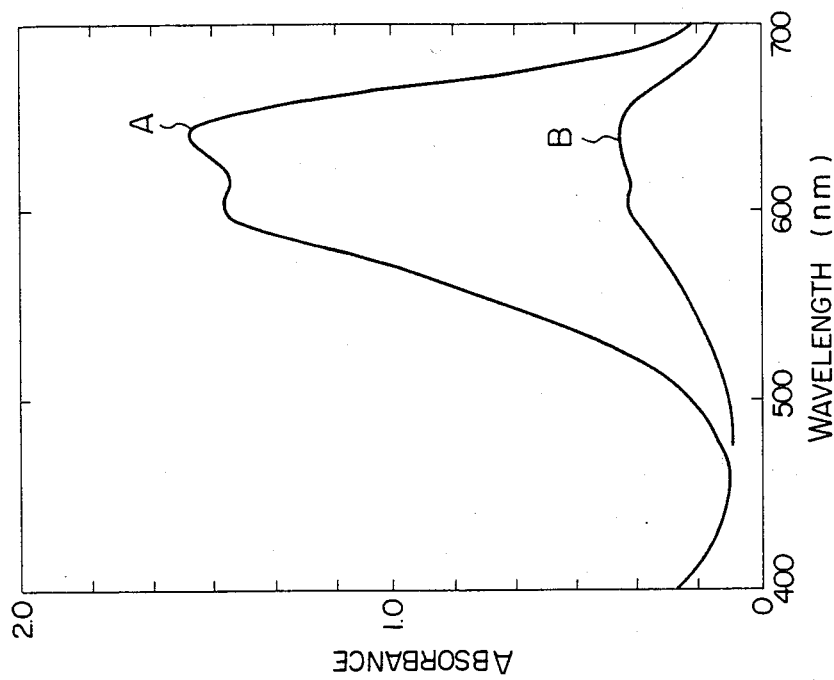
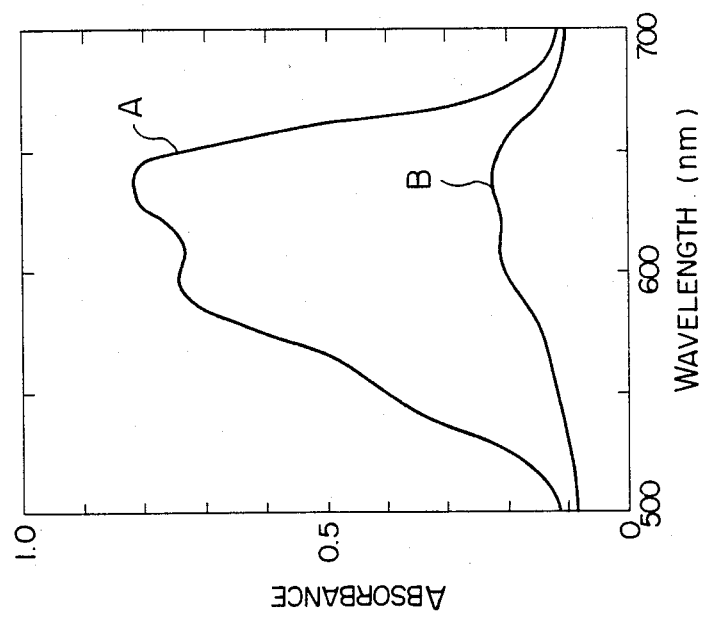

GUEST-HOST TYPE LIQUID CRYSTAL COMPOSITION AND LIQUID CRYSTAL DISPLAY DEVICE USING THE SAME

As display devices using liquid crystals, there are generally those using the electrooptical effects of liquid crystal materials themselves and those using electrooptical effects brought about by the interaction of the liquid crystal with a foreign matter. A typical example of the latter is a dye called pleochroic dye dissolved as a guest in a host liquid crystal such as a nematic liquid crystal, a cholesteric liquid crystal, a smectic liquid crystal, or the like. The pleochroic dyes can be divided into two kinds of groups. The pleochroic dyes of the first kind are those in which the direction of the absorption transition moment in the visible region is almost parallel to the direction of the long axis of the molecules and the long axis of the dye molecules is well aligned in the same direction as that of the axis of the liquid crystal molecules when the dye is dissolved as guest molecules in the aforesaid liquid crystal. Such dyes are called pleochroic dyes having parallel dichroism. The pleochroic dyes of the second kind are those in which the direction of the absorption transition moment in the visible region is almost perpendicular to the direction of the long axis of the molecules and the long axis of the dye molecules is well aligned in the same direction as that of the axis of the liquid crystal molecules when the dye is dissolved as guest molecules in the aforesaid liquid crystal. Such dyes are called pleochroic dyes having perpendicular dichroism. This invention relates to a liquid crystal composition containing a pleochroic dye of the first kind, i.e., a pleochroic dye having parallel dichroism. The degree of the alignment of the pleochroic dye molecules dissolved in such a liquid crystal material can quantitatively expressed in terms of the order parameter S mentioned hereinafter.

When a nematic or cholesteric liquid crystal containing such a pleochroic dye is interposed between two electrode plates placed face to face, and a voltage is applied to them, the liquid crystal molecules exhibit turbulent motion or are uniformly aligned along the electric field direction depending upon the dielectric characteristics or flow characteristics of the liquid crystal. In this case, since the pleochroic dye molecules also move in cooperation with the liquid crystal molecules, a change is made in the relative direction of the absorption transition moment of the pleochroic dye molecules and the incident light to each other, and consequently, the light-absorption characteristics of liquid crystal display devices are changed. Such a phenomenon is widely known as "guest-host effect", and a color display device using electric control can be constituted by utilizing this effect.

Guest-host type liquid crystal display devices are disclosed in U.S. Pat. Nos. 4,154,746 and 3,960,751, Laid-open British Patent Appln. Nos. 2024844A and 2011940A, etc.

In order to obtain excellent contrast between the on-state and the off-state in a liquid crystal display device utilizing such a guest-host effect, the pleochroic dye as a guest should have such property that is shows deep coloration in one state and almost no coloration in the other state. That is to say, in order to give deep coloration, it is necessary that the absorption transition moment of the pleochroic dye should be aligned parallel to the electrical vector of the incident white light, i.e., perpendicularly to the direction of propagation of the light. On the other hand, in order to give almost no coloration, it is necessary that the absorption transition moment of the pleochroic dye molecules should be aligned perpendicularly to the electrical vector of the incident white light, i.e., parallel to the direction of propagation of the light.

However, the liquid crystal molecules and the dye molecules undergo thermal fluctuation with respect to alignment, so the absorption transition moment cannot always be perpendicular or parallel to the direction of propagation of the light. Therefore, the degree of alignment in a specific direction in the liquid crystal gives a great effect on the contrast of the display device. The degree of alignment of the dye molecules in the liquid crystal medium is usually expressed in terms of a numerical value called an order parameter (S), and can be obtained by using the following equation:

$$S = \frac{A_{\|} - A_{\perp}}{2A_{\perp} + A_{\|}}$$

wherein $A_{\|}$ and $A_{\perp}$ represent the absorbances of the dye molecules to the lights polarized parallel to and perpendicularly to the orientational direction (director) of the host liquid crystal, respectively. Therefore, if $A_{\|}$ and $A_{\perp}$ are obtained by measuring absorption spectra, the order parameter of the dye in the host liquid crystal can be obtained, and the orientation of the dye can be evaluated (as to a method for measuring the order parameter of a pleochroic dye, see "Absorption and Pitch Relationships in Dichroic Guest-Host Liquid Crystal System"; H. S. Cole Jr., S. Aftergut, Journal of Chemical Physics, 1978, vol. 68, 896).

The value of the order parameter of the pleochroic dye dissolved in the host liquid crystal can range from −0.5 to 1 theoretically. In the case of pleochroic dyes having parallel dichroism, when the value of the order parameter comes closer to 1, the degree of order of the orientation of the dye in the liquid crystal is increased, and the contrast of the device can be improved.

Such pleochroic dyes should have properties satisfying the following requirements: that is, 1 the value of the order parameter in the host liquid crystal is larger in order to obtain remarkable contrast between the colored state and the uncolored state; 2 clear colors can be obtained by adding only a small amount of the dyes to the host liquid crystal material; and 3 the dyes are excellent in stability to light, heat, water, oxygen, and the like. Among these, the value of the order parameter in 1 is usually desired to be 0.5 or larger at temperatures near room temperature in the case of pleochroic dyes having parallel dichroism. In usual, the value of the order parameter varies to some extent even in the case of the same dye if conditions such as the kind of the host liquid crystal, the concentration of the dye, temperature, and the like vary.

Among well-known pleochroic dyes, there are a very few dyes satisfying the above-mentioned requirements 1 to 3.

An object of this invention is to provide a liquid crystal composition containing an anthraquinone pleochroic dye which satisfies the above-mentioned requirements 1 to 3.

It is another object of this invention is to provide a liquid crystal composition for color display in which the hue of the aforesaid dye include red, blue and bluish purple. Other objects will become apparent from the description of the present specification.

In the attached drawings,

FIGS. 1, 2 and 15(a), 15(b) are schematic sectional views of guest-host type liquid crystal display devices;

FIGS. 3, 5, 6, 8, 9, 10, 13, 14, 16, 17 and 18 are graphs showing the spectroscopic characteristics of the guest-host type liquid crystal compositions in the examples of this invention; and FIGS. 4, 7, 11 and 19 are graphs showing a relationship between percentage of change of the absorbance of guest-host liquid crystal compositions and accelerated weathering time in an accelerated weathering test using a sunshine weather meter.

This invention has been made in order to accomplish the above-mentioned objects, and is characterized by a liquid crystal composition containing at least one of anthraquinone dyes represented by the formula:

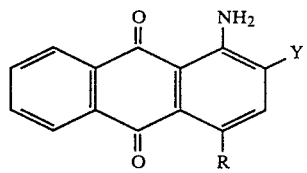

(I)

wherein R is OH or $NH_2$, provided that (a) when R is OH, Y is selected from the group consisting of a phenoxy group, an alkoxy group, a phenylthio group, an alkylthio group (these groups being able to have one or more substituents) and a group of formula: COXR' in which X is an oxygen atom, a sulfur atom, or NZ (in which Z is a hydrogen atom or a lower alkyl group), and R' is an alkyl group, a cycloalkyl group, a substituted alkyl group, a substituted cycloalkyl group, an aryl group, or a substituted aryl group, and (b) when R is $NH_2$, Y is a group of the formula: COXR' in which X is an oxygen atom, a sulfur atom or NZ (in which Z is a hydrogen atom or a lower alkyl group), and R' is an alkyl group, a cycloalkyl group, a substituted alkyl group, a substituted cycloalkyl group, an aryl group or a substituted aryl group.

More in detail, in the above-mentioned (a), when Y is a substituted phenoxy group, examples of the substituent group contained therein are an alkyl group represented by $-C_nH_{2n+1}$ (in which "n" represents an integer of 1 to 18), a substituted alkyl group represented by $-C_nH_{2n}CN$ or $C_nH_{2n}COOCH_3$ (in which "n" represents an integer of 1 to 5), an alkoxy group represented by $-OC_nH_{2n+1}$ (in which "n" represents an integer of 1 to 18), an alkylbenzyloxy group, an aryloxyethoxy group, a cyclohexyl group, an alkylcyclohexyl group, a phenyl group, an alkylphenyl group, an alkoxyphenyl group, an acyloxy group, an acylamino group, a sulfonyloxy group, a sulfonamide group, a group of a carboxylic acid ester, a carbamoyl group, a group of a sulfonic acid ester, a sulfamoyl group, an alkylamino group, a halogen atom, a nitro group, a cyano group, a methylthio group, and the like. The alkoxy group of Y can be represented by $-OC_nH_{2n+1}$ (in which "n" represents an integer of 1 to 18), and as the substituted alkoxy group,

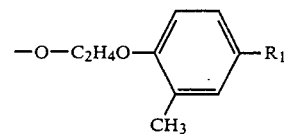

(in which $R_1$ is $C_nH_{2n}CN$ or $C_nH_{2n}COOCH_3$, and "n" represents an integer of 1 to 5) may be exemplified. When Y is a substituted phenylthio group, examples of the substituent group contained therein are an alkyl group, an alkoxy group and a hydroxyl group. The alkylthio group can be represented by $-S-C_nH_{2n+1}$ (in which "n" represents an integer of 1 to 18).

The aforesaid anthraquinone dyes can be produced, for example, in the following manner.

The dyes can be synthesized by reacting a compound of the formula:

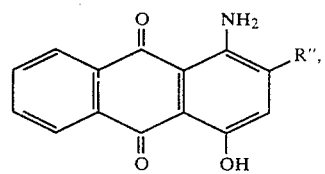

wherein R" represents a halogen atom, an aryloxy group or a sulfonic acid group, with a compound of the formula: HY, wherein Y is as defined above, in the presence of an acid binding agent such as an alkali carbonate, a caustic alkali, or the like. The dye thus synthesized is used after being purified by using means such as column chromatography, recrystallization, sublimation and the like.

The aforesaid dye shows a hue of red.

When Y is COXR', this invention is characterized by a liquid crystal composition containing at least one of the aforesaid anthraquinone dyes represented by the general formula (I) in which the group represented by R' includes a methyl group, an ethyl group, a propyl group, a butyl group, a pentyl group, a hexyl group, an octyl group, a nonyl group, a decyl group, a dodecyl group, an octadecyl group and the like; a substituted alkyl group, examples of the substituent group in the substituted alkyl groups include a hydroxyl group, an alkoxy group, a cycloalkyl group, an aryl group, an aryloxy group, a dialkylamino group, a heterocyclic group, and the like; the cycloalkyl group includes a cyclohexyl group, and the like; a substituted cycloalkyl group, examples of the substituent group in the substituted cycloalkyl groups include an alkyl group, a cyclohexyl group, an alkylcyclohexyl group, and the like; a substituted aryl group, examples of the substituent group in the substituted aryl groups include a phenyl group, an alkylphenyl group, an alkoxyphenyl group, an alkyl group, an alkoxy group, a cycloalkyl group, an alkylcyclohexyl group, a hydroxyl group, an acyloxy group, an acylamino group, a sulfonyloxy group, a sulfonamide group, a group of a carboxylic acid ester, a carbamoyl group, a group of a sulfonic acid ester, a sulfamoyl group, a dialkylamino group, a halogen atom, a nitro group, a cyano group, and the like. Said dye shows a hue of bluish purple.

In the case of the above-mentioned (b), R' in COXR' is as defined in the above-mentioned (a). Said dye can be produced by reducing, for example, a compound of the formula:

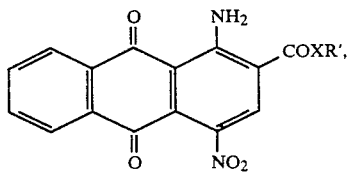

wherein X and R' are as defined in the above-mentioned general formula (I), respectively, with sodium sulfide, hydrazine hydrate, or the like. The aforesaid anthraquinone dye shows a hue of blue.

As the liquid crystal used in this invention, liquid crystals may be selected from fairly wide range so long as they show a nematic state in the operation temperature range. The nematic state of such nematic crystal liquid can be converted into a cholesteric state by adding an optically active substance hereinafter mentioned to the nematic liquid crystal. Examples of the nematic liquid crystals are substances shown in Table 1 and derivatives thereof.

In Table 1, X' represents a nitro group, a cyano group, or a halogen atom, and $R^2$ represents an alkyl group or an alkoxy group.

TABLE 1

| No. | Kind | Examples |
|---|---|---|
| 1 | Cyclohexylcyclohexane series | $R^2$—(H)—(H)—X' |
| 2 | Phenylcyclohexane series | $R^2$—(H)—⟨⟩—X' |
| 3 | Biphenyl series | $R^2$—⟨⟩—⟨⟩—X' |
| 4 | Terphenyl series | $R^2$—⟨⟩—⟨⟩—⟨⟩—X' |
| 5 | Cyclohexylcyclohexanoate series | $R^2$—(H)—COO—(H)—X' |
| 6 | Phenylcyclohexyl carboxylate series | $R^2$—(H)—COO—⟨⟩—X' |
| 7 | Ester series | $R^2$—⟨⟩—COO—⟨⟩—X' |
| 8 | Diester series | $R^2$—⟨⟩—COO—⟨⟩—COO—⟨⟩—X' |
|  |  | X'—⟨⟩—COO—⟨⟩—COO—⟨⟩—$R^2$ |
| 9 | Biphenylcyclohexylcarboxylate series | $R^2$—(H)—COO—⟨⟩—⟨⟩—X' |

TABLE 1-continued
| No. | Kind | Examples |
|---|---|---|
| 10 | Biphenyl ester series | 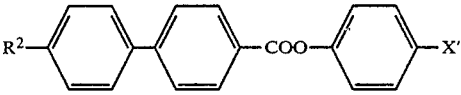 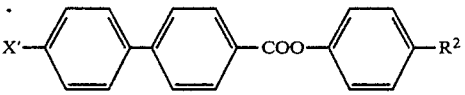 |
| 11 | Thioester series | 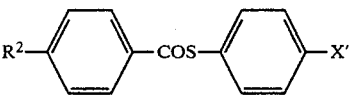 |
| 12 | Shiff base series | 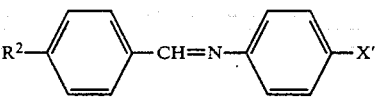 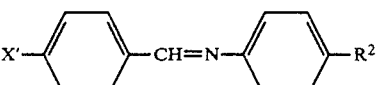 |
| 13 | Pyrimidine series | 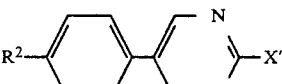 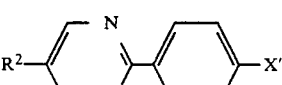 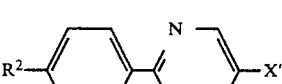 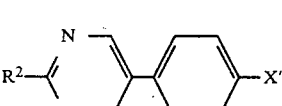 |
| 14 | Dioxane series | 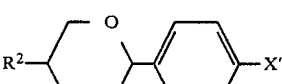 |
| 15 | Cyclohexylmethyl ether series | 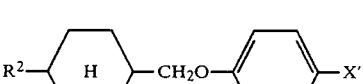 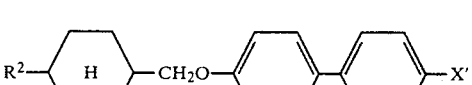 |
| 16 | Cynnamoyl nitrile series | 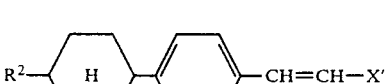 |
All the liquid crystals in Table 1 have positive dielectric anisotropy, however the ester, azoxy, azo, Shiff As the optically active substances, there are chiral nematic compounds, for example, compounds obtained by introducing an optically active group such as 2-methylbutyl, 3-methylbutoxy, 3-methylpentyl, 3-methylpentoxy, 4-methylhexyl, 4-methylhexytoxy, or the like into a nematic liquid crystal. There may be used alcohol derivatives such as l-menthol, d-borneol, and the like; ketone derivatives such as d-camphor, 3-methylcyclohexane, and the like; carboxylic acid derivatives such as d-citronellic acid, l-camphoric acid, and the like, aldehyde derivatives such as d-citronellal and the like; alkene derivatives such as d-linonene and the like; and other amines, amides, nitrile derivatives, etc., which are disclosed in Japanese Patent Appln Kokai (Laid-Open) No. 45546/76.

This invention is more concretely explained below referring to Examples.

EXAMPLE 1

As a host liquid crystal, there was used a mixture prepared by adding 7% by weight of 4-(2-methylbutyl)-4'-cyanobiphenyl as an optically active substance to a phenylcyclohexane series liquid crystal (ZLI-1132, trade name, manufactured by Merck Co., Ltd., West Germany) which is a mixture of the following four compounds:

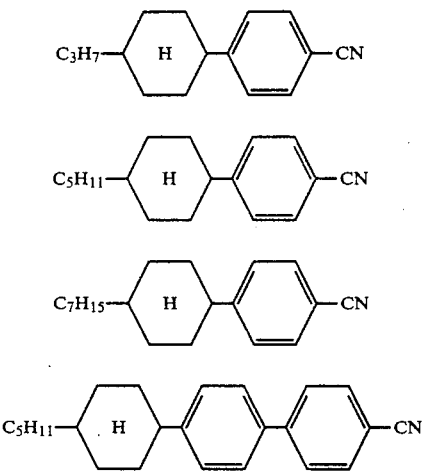

Each of the anthraquinone dyes shown in Table 2 was added as a guest dye to the host liquid crystal and a step comprising heating the resulting mixture to 70° C. or higher, sufficiently stirring it in an isotropic liquid state, and then allowing it to cool was repeated to dissolve said dye.

The aforesaid liquid crystal composition thus prepared was sealed in a device shown in FIG. 1 with a gap of 10 μm, composed of two upper and lower glass plates having transparent electrodes 4 and 4', the surfaces of which were contacted with the liquid crystal 3 and were subjected to rubbing after these surfaces were coated with a polyamide series resin and cured. In the device subjected to the aforesaid orientation treatment, when no voltage is applied as shown in FIG. 1, the liquid crystal composition is in cholesteric state called grandjean state in which the helix axis 7 is perpendicular to the surface of the glass plates and thus the dye molecules 2, the guest, have the same orientation according to the orientation of the host liquid crystal 3. Consequently, the device appears to be intensely colored.

Figure 2:
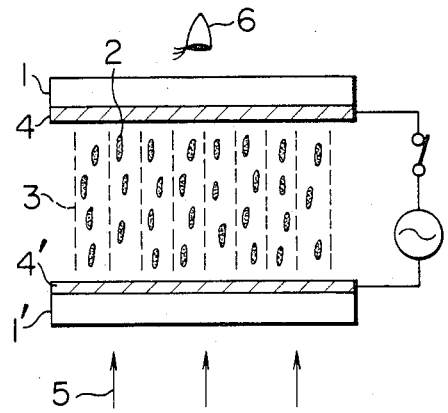

When an alternating current voltage of 30 V, 50 Hz is applied to the aforesaid device, as shown in FIG. 2, since the liquid crystal composition has such a homeotropic orientation that the orientation direction is perpendicular to the surface of the glass plates, and thus the dye molecules 2 have the same orientation according to the orientation of the host liquid crystal 3, the device is in an almost uncolored transparent condition. When a copper block through which an electrothermic wire was passed was brought into close contact with the aforesaid device to heat the device to 70° C. or higher, the liquid crystal composition comes to be in an isotropic liquid state, and both liquid crystal molecules and the dye molecules come to be in a random state. The visible absorption spectra of the aforesaid guest-host device were measured in each of the grandjean state, the homotropic state and the isotropic state, and the absorbance and the wavelength of maximum absorption in each of the above-mentioned states were obtained. In obtaining the absorbance of the dye, correction was made for the absorbance as to the host liquid crystal and the reflection loss by the device. By the use of the thus obtained values of the absorbance of the dye in each of the above-mentioned states, the values of the order parameter were calculated according to the above-mentioned method.

In obtaining the order parameter of each of the dyes shown in Table 2, the added amount of each of said dyes on the basis of the host liquid crystal varies depending upon the dye, though it is 0.1% by weight or mored, preferably ranges approximately from 0.3 to 3% by weight. Values of the order parameter sometimes vary to some extent when the kind of the host liquid crystal or the concentration of the dye is varied.

The maximum absorption wavelength and the order parameter of each dye are shown in Table 2.

TABLE 2

| No. | Chemical formula (I) R | Y | Maximum absorption wavelength (nm) | Order parameter |
|---|---|---|---|---|
| 1 | OH | —O—⟨ ⟩ | 518 | 0.65 |
| 2 | " | —O—⟨ ⟩—CH₃ | 519 | 0.64 |
| 3 | " | —O—⟨ ⟩—C₂H₅ | 518 | 0.68 |
| 4 | " | —O—⟨ ⟩—C₃H₇(n) | 518 | 0.58 |

TABLE 2-continued

| No. | R | Y | Maximum absorption wavelength (nm) | Order parameter |
|---|---|---|---|---|
| 5 | " | —O—⟨⟩—C$_4$H$_9$(n) | 519 | 0.69 |
| 6 | " | —O—⟨⟩—C$_5$H$_{11}$(n) | 519 | 0.65 |
| 7 | " | —O—⟨⟩—C$_6$H$_{13}$(n) | 518 | 0.63 |
| 8 | " | —O—⟨⟩—C$_8$H$_{17}$(n) | 518 | 0.61 |
| 9 | " | —O—⟨⟩—C$_9$H$_{19}$(n) | 518 | 0.63 |
| 10 | " | —O—⟨⟩—CH(CH$_3$)$_2$ | 518 | 0.65 |
| 11 | " | —O—⟨⟩—CH(CH$_3$)(C$_2$H$_5$) | 518 | 0.67 |
| 12 | " | —O—⟨⟩—C(CH$_3$)$_3$ | 518 | 0.66 |
| 13 | " | —O—⟨⟩—C(CH$_3$)$_2$—CH$_2$—C(CH$_3$)$_3$ | 518 | 0.67 |
| 14 | " | —O—⟨⟩—OCH$_3$ | 523 | 0.63 |
| 15 | " | —O—⟨⟩—OC$_2$H$_5$ | 518 | 0.64 |
| 16 | " | —O—⟨⟩—OC$_3$H$_7$(n) | 519 | 0.65 |
| 17 | " | —O—⟨⟩—OC$_4$H$_9$(n) | 518 | 0.62 |
| 18 | " | —O—⟨⟩—OC$_5$H$_{11}$(n) | 518 | 0.67 |
| 19 | " | —O—⟨⟩—OC$_6$H$_{13}$(n) | 518 | 0.67 |
| 20 | " | —O—⟨⟩—OC$_7$H$_{15}$(n) | 518 | 0.67 |
| 21 | " | —O—⟨⟩—OC$_8$H$_{17}$(n) | 519 | 0.66 |
| 22 | " | —O—⟨⟩—OC$_{18}$H$_{37}$(n) | 518 | 0.63 |

TABLE 2-continued

| No. | R | Y | Maximum absorption wavelength (nm) | Order parameter |
|---|---|---|---|---|
| 23 | " | —O—⟨C₆H₄⟩—SCH₃ | 518 | 0.65 |
| 24 | " | —O—⟨C₆H₄⟩—⟨C₆H₁₁⟩H | 518 | 0.69 |
| 25 | " | —O—⟨C₆H₄⟩—⟨C₆H₅⟩ | 523 | 0.62 |
| 26 | " | —O—⟨C₆H₃(CH₃)⟩—C₂H₄CN | 520 | 0.60 |
| 27 | " | —O—⟨C₆H₃(CH₃)⟩—C₂H₄COOCH₃ | 522 | 0.61 |
| 28 | " | —OC₂H₄O—⟨C₆H₃(CH₃)⟩—C₂H₄CN | 521 | 0.61 |
| 29 | " | —OC₂H₄O—⟨C₆H₃(CH₃)⟩—C₂H₄COOCH₃ | 518 | 0.62 |
| 30 | " | —OCH₃ | 518 | 0.57 |
| 31 | " | —OC₈H₁₇(n) | 519 | 0.64 |
| 32 | " | —OC₁₁H₂₃(n) | 518 | 0.62 |
| 33 | " | —OC₁₈H₃₇(n) | 518 | 0.60 |
| 34 | " | —SC₈H₁₇(n) | 537 | 0.57 |
| 35 | " | —SC₁₈H₃₇(n) | 537 | 0.56 |
| 36 | " | —O—⟨C₆H₄⟩—OCOCH₃ | 519 | 0.60 |
| 37 | " | —O—⟨C₆H₄⟩—OCO—⟨C₆H₄⟩—C₅H₁₁(n) | 519 | 0.66 |
| 38 | " | —O—⟨C₆H₄⟩—NHCOCH₃ | 520 | 0.59 |
| 39 | " | —O—⟨C₆H₄⟩—NHCO—⟨C₆H₄⟩—C₅H₁₁(n) | 520 | 0.66 |
| 40 | " | —O—⟨C₆H₄⟩—O—SO₂—⟨C₆H₅⟩ | 520 | 0.59 |
| 41 | " | —O—⟨C₆H₄⟩—OSO₂—⟨C₆H₄⟩—CH₃ | 520 | 0.60 |
| 42 | " | —O—⟨C₆H₄⟩—OSO₂—⟨C₆H₄⟩—C₄H₉(n) | 520 | 0.62 |
| 43 | " | —O—⟨C₆H₄⟩—OCO—⟨C₆H₄⟩—C₄H₉(n) | 519 | 0.66 |
| 44 | " | —O—⟨C₆H₄⟩—OCO—⟨C₆H₄⟩—OC₈H₁₇(n) | 519 | 0.67 |

TABLE 2-continued

| No. | R | Y | Maximum absorption wavelength (nm) | Order parameter |
|---|---|---|---|---|
| 45 | " | —O—⟨⟩—OCO—⟨H⟩—C$_5$H$_{11}$(n) | 519 | 0.66 |
| 46 | " | —O—⟨⟩—OCOC$_8$H$_{17}$(n) | 520 | 0.59 |
| 47 | " | —O—⟨⟩—COOC$_4$H$_9$(n) | 522 | 0.60 |
| 48 | " | —O—⟨⟩—CONH—⟨⟩—C$_4$H$_9$(n) | 520 | 0.65 |
| 49 | " | —O—⟨⟩—SO$_2$OC$_4$H$_9$(n) | 523 | 0.55 |
| 50 | " | —O—⟨⟩—SO$_2$O—⟨⟩ | 521 | 0.63 |
| 51 | " | —O—⟨⟩—SO$_2$NHC$_3$H$_6$OCH$_3$ | 522 | 0.57 |
| 52 | " | —O—⟨⟩—NHSO$_2$—⟨⟩—CH$_3$ | 519 | 0.65 |
| 53 | " | —O—⟨⟩—N(C$_2$H$_5$)(C$_2$H$_5$) | 526 | 0.38 |
| 54 | " | —O—⟨⟩—NHC$_4$H$_9$(n) | 520 | 0.68 |
| 55 | " | —O—⟨⟩—N(C$_4$H$_9$(n))(C$_4$H$_9$(n)) | 519 | 0.57 |
| 56 | " | —O—⟨⟩—Cl | 526 | 0.60 |
| 57 | " | —O—⟨⟩—Br | 520 | 0.62 |
| 58 | " | —O—⟨⟩—NO$_2$ | 522 | 0.59 |
| 59 | " | —O—⟨⟩—CN | 559 | 0.44 |
| 60 | " | —O—⟨⟩—CON(C$_4$H$_9$(n))(C$_4$H$_9$(n)) | 520 | 0.59 |
| 61 | " | —O—⟨⟩—SO$_2$O—⟨⟩—C$_4$H$_9$(n) | 521 | 0.61 |
| 62 | " | —O—⟨⟩—SO$_2$O—⟨⟩—C$_9$H$_{19}$(n) | 521 | 0.60 |

TABLE 2-continued

| No. | R | Chemical formula (I) Y | Maximum absorption wavelength (nm) | Order parameter |
|---|---|---|---|---|
| 63 | " | 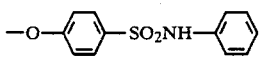 | 522 | 0.66 |
| 64 | " | 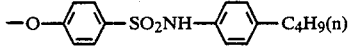 | 522 | 0.65 |
| 65 | " | 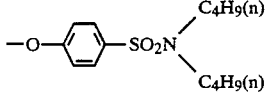 | 522 | 0.56 |
| 66 | " | 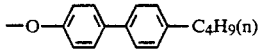 | 519 | 0.68 |
| 67 | " | 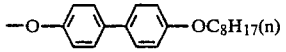 | 519 | 0.67 |
| 68 | " | 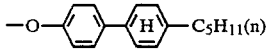 | 519 | 0.66 |
| 69 | " | 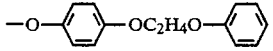 | 521 | 0.60 |
| 70 | " | 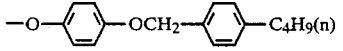 | 518 | 0.64 |
| 71 | " | 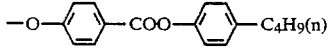 | 522 | 0.60 |
| 72 | " |  | 534 | 0.52 |
| 73 | " | 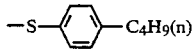 | 534 | 0.50 |
| 74 | " |  | 534 | 0.51 |
| 75 | " | 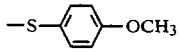 | 534 | 0.54 |
| 76 | " | 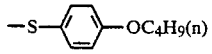 | 534 | 0.53 |

The pleochroic anthraquinone dyes shown in Table 2 are excellent in solubility in liquid crystals.

A solution of each of the dyes listed in Table 2 in a liquid crystal ZLI-1132 manufactured by Merck Co., Ltd. was sealed in a liquid crystal display device composed of two transparent glass base plates of 3 mm in thickness, and then subjected to an accelerated weathering test by means of the sunshine weather meter hereinafter mentioned. As a result thereof, percentages of decrease in absorbance of all the dyes were 10% or less 100 hours after the accelerated weathering, indicating that the dye used in this invention is very high in stability to light.

EXAMPLE 2

A solution of 1% by weight of the dye of No. 1 in Table 2 in the same liquid crystals as used in Example 1 was sealed in the same liquid crystal display device as used in Example 1.

Figure 3:
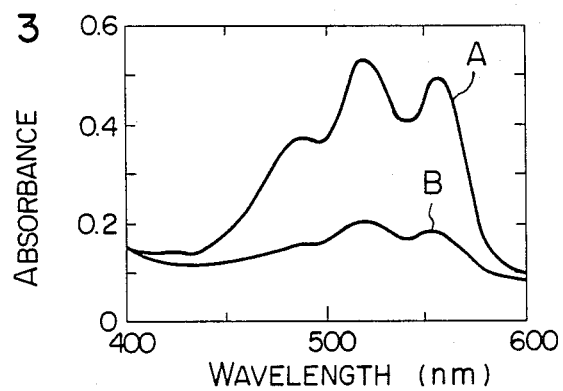

When the aforesaid pleochroic dye was used, the dye had a bright red color when no voltage was applied and had a very light red color when a voltage was applied, and good contrast was obtained between the on-state and the off-state. The absorption spectra of the aforesaid device measured when no voltage was applied (A) and when a voltage was applied (B) are shown in FIG. 3. The maximum absorption wavelength and the order parameter of the dye in this example in the aforesaid host liquid crystal were 518 nm and 0.65, respectively.

Next, said device was allowed to stand in the sunshine weather meter for 100 hours, and the change in the absorbance was examined. For comparison, representative conventional dyes were subjected to accelerated weathering in the same manner as in the case of the aforesaid anthraquinone dye. The sunshine weather meter used in this Example continuously emits almost white strong light by means of a carbon arc lamp. Further, water is directly sprayed on the sample device at a rate of 18 minutes for 120 minutes, and the inside of the sample room of the weather meter was maintained at atmospheric pressure, a temperature of 35° to 60° C. and a humidity of 30 to 70%.

Figure 4:
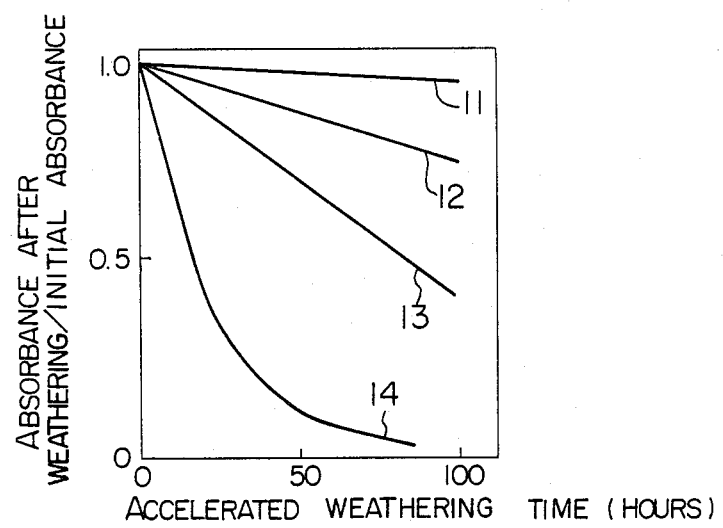

The results of the accelerated weathering test by means of the aforesaid weather meter are shown in FIG. 4. In FIG. 4, the curves 11, 12, 13 and 14 show changes in absorbances of the devices in which was sealed each of liquid crystal compositions containing the dye in this Example (the curve 11), a merocyanine dye of the formula (the curve 12):

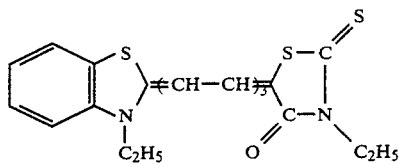

an azo dye of the formula (the curve 13):

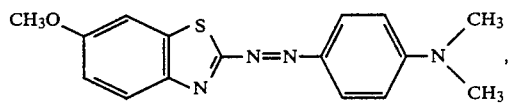

and an azomethine dye of the formula (the curve 14):

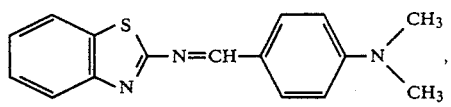

respectively. It is clear from FIG. 4 that the dye used in this invention is very high in stability as compared with conventional dichroic dyes. The percentage of decrease in the absorbance of the liquid crystal composition containing the anthraquinone dye in this Example was 10% or less 100 hours after the accelerated weathering by means of the aforesaid weather meter.

The transparent glass base plates of the device used in this Example had a transmittance of almost zero at wavelengths of 300 nm or shorter.

EXAMPLE 3

A liquid crystal composition prepared by adding 1% by weight of the dye No. 5 in Table 2 as a pleochroic dye to the same liquid crystals (containing 7% by weight of the optically active substance) as used in Example 2, was sealed in the same device as used in Example 2, and absorption spectra of the device were measured when no voltage was applied and when a voltage was applied. Also in this case, good contrast could be obtained between the off-state and the on-state. The maximum absorption wavelength and the order parameter of the dye in this Example in the aforesaid liquid crystal were 519 nm and 0.69, respectively.

When the accelerated weathering test for 100 hours was carried out in the same manner as in Example 2, the percentage of decrease in the absorbance of the liquid crystal composition was 10% or less, indicating that the dye used in this invention is excellent in stability.

EXAMPLE 4

Figure 5:
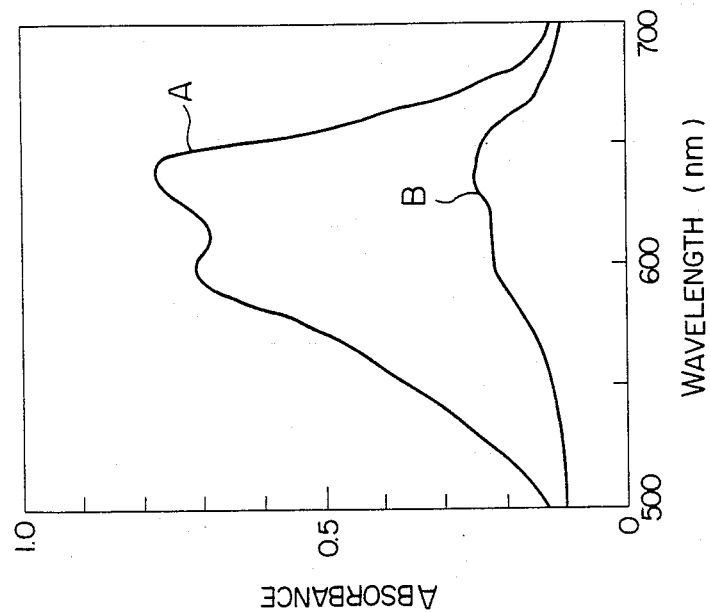

A liquid crystal composition prepared by adding 3% by weight of the dye of No. 19 in Table 2 as a pleochroic dye to the same liquid crystals (containing 7% by weight of the optically active substance) as used in Example 2 was sealed in the same device as used in Example 2, and absorption spectra of the device were measured when no voltage was applied and when a voltage was applied. The results are shown in FIG. 5. Also in this case, good contrast was obtained between the off-state A and the on-state B. The maximum absorption wavelength and the order parameter of the dye in this Example in the aforesaid liquid crystal were 518 nm and 0.67, respectively.

When the accelerated weathering test for 100 hours was carried out in the same manner as in Example 2, the percentage of decrease in the absorbance of the liquid crystal composition was 10% or less, indicating that the dye used in this invention is excellent in stability.

EXAMPLE 5

The maximum absorption wavelength and the order parameter of each of the dyes shown in Table 3 were measured in the same manner as in Example 1.

TABLE 3

| | Chemical formula (I) | | Maximum absorption wavelength | Order |
|---|---|---|---|---|
| No. | R | Y | (nm) | parameter |
| 1 | $NH_2$ | $-COOCH_3$ | 638 | 0.69 |
| 2 | " | $-COOC_2H_5$ | 638 | 0.68 |
| 3 | " | $-COOC_3H_7(n)$ | 638 | 0.66 |
| 4 | " | $-COOC_4H_9(n)$ | 638 | 0.66 |
| 5 | " | $-COOC_4H_9(n)$ | 638 | 0.64 |
| 6 | " | $-COOC_6H_{13}(n)$ | 638 | 0.66 |
| 7 | " | $-COOC_8H_{17}(n)$ | 637 | 0.68 |
| 8 | " | $-COSC_8H_{17}(n)$ | 644 | 0.70 |
| 9 | " | $-COOCH_2CH(C_2H_5)(C_4H_9(n))$ | 637 | 0.62 |
| 10 | " | $-COOC_{12}H_{25}(n)$ | 638 | 0.67 |
| 11 | " | $-COOC_{18}H_{37}(n)$ | 638 | 0.68 |
| 12 | " | $-COSC_{18}H_{37}(n)$ | 646 | 0.72 |
| 13 | " | $-COO-\langle H \rangle$ | 636 | 0.68 |
| 14 | " | $-COS-\langle H \rangle$ | 644 | 0.71 |
| 15 | " | $-COO-\langle H \rangle-C_4H_9$ | 637 | 0.69 |
| 16 | " | $-COO-\langle H \rangle-C_9H_{19}$ | 637 | 0.69 |
| 17 | " | $-COO-\langle H \rangle-\langle H \rangle$ | 637 | 0.74 |
| 18 | " | $-COOCH_2-\langle\ \rangle$ | 640 | 0.62 |
| 19 | " | $-COOC_2H_4-\langle\ \rangle$ | 639 | 0.69 |

TABLE 3-continued

| No. | Chemical formula (I) R | Y | Maximum absorption wavelength (nm) | Order parameter |
|---|---|---|---|---|
| 20 | " | —COOC₂H₄—⟨H⟩ | 638 | 0.66 |
| 21 | " | —COOC₂H₄OC₂H₅ | 638 | 0.65 |
| 22 | " | —COOC₂H₄OC₄H₉(n) | 638 | 0.64 |
| 23 | " | —COOC₂H₄OH | 638 | 0.64 |
| 24 | " | —COSC₂H₄OH | 646 | 0.67 |
| 25 | " | —COOC₂H₄N(CH₃)₂ | 600 | 0.62 |
| 26 | " | —COOC₂H₄O—⟨phenyl⟩ | 638 | 0.65 |
| 27 | " | —COOCH₂—⟨furan⟩ | 638 | 0.60 |
| 28 | " | —COOCH₂—⟨tetrahydrofuran, H⟩ | 638 | 0.66 |
| 29 | " | —COOCH₂—⟨pyridine⟩ | 642 | 0.50 |
| 30 | " | —COS—⟨H⟩—⟨H⟩ | 644 | 0.75 |

The pleochroic anthraquinone dyes shown in Table 3 are also excellent in solubility in liquid crystals.

EXAMPLE 6

Figure 6:
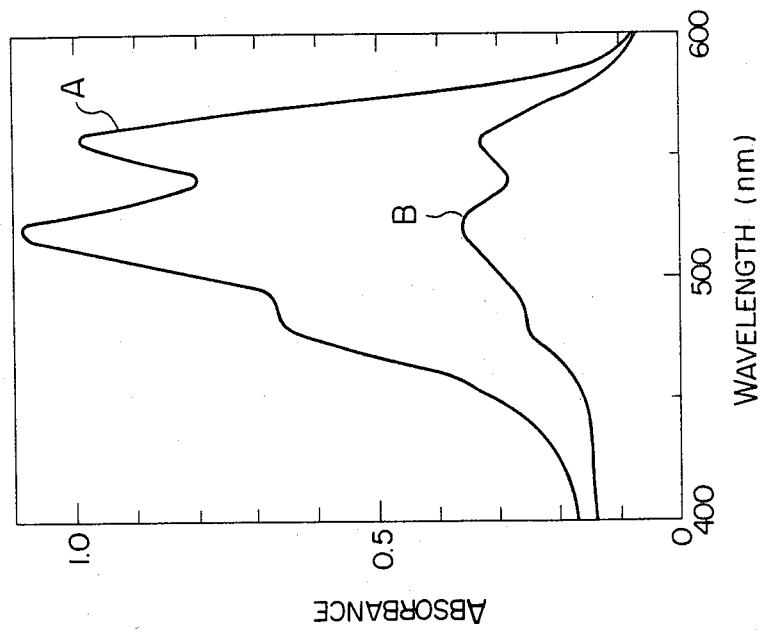

A liquid crystal composition prepared by dissolving 1% by weight of the dye of No. 7 in Table 3 as a pleochroic dye in the same liquid crystals (containing 7% by weight of the optically active substance) as used in Example 1, was sealed in the same liquid crystal device as in Example 2. Said element had a very pale blue color when a voltage was applied and had a bright blue color when no voltage was applied, and good contrast was obtained between the on- and off-states. The results are shown in FIG. 6. The maximum absorption wavelength and the order parameter of the guest dye in this Example in said liquid crystal were 638 nm and 0.68, respectively.

The results of the accelerated weathering test of the aforesaid device by means of the sunshine weather meter are shown in FIG. 7. In FIG. 7, the curve 21 shows the percentage of change in the absorbance of the device in which the dye in this example was used, and the curves 12, 13 and 14 show those of devices in which a merocyanine dye, an azo dye and an azomethine dye were used, respectively, just as in the case of the above-mentioned FIG. 4.

As is clear from FIG. 7, the dye of this Example is very high in stability.

EXAMPLE 7

The spectroscopic characteristics of a device in which a liquid crystal composition containing the dye of No. 10 in Table 3 and prepared in the same manner as Example 6 had been sealed were measured just as in Example 6.

The results are shown in FIG. 8. The maximum absorption wavelength of said dye was 638 nm, and the order parameter thereof was 0.67.

When the accelerated weathering test for 100 hours by means of the sunshine weather meter was carried out just as in Example 6, the percentage of decrease in the absorbance of the liquid crystal composition was 10% or less.

EXAMPLE 8

The spectroscopic characteristics of a liquid crystal composition containing 3% by weight of the dye of No. 17 in Table 3 and prepared in the same manner as Example 6 were measured just as in Example 6.

The results are shown in FIG. 9. Also in this case, good contrast was obtained between the on- and off-states. The maximum absorption wavelength and the order parameter of the dye in this Example in said liquid crystal were 637 nm and 0.74, respectively.

When the accelerated weathering test for 100 hours was carried out in the same manner as in Example 2, the percentage of decrease in the absorbance of the liquid crystal composition was 10% or less, indicating that the dye in this Example is excellent in stability.

EXAMPLE 9

The maximum absorption wavelength and the order parameter of each of the dyes shown in Table 4 were measured in the same manner as in Example 1.

TABLE 4

| No. | Chemical formula (I) R | Y | Maximum absorption wavelength (nm) | Order parameter |
|---|---|---|---|---|
| 1 | NH₂ | —COO—⟨phenyl⟩ | 642 | 0.72 |
| 2 | " | —COS—⟨phenyl⟩ | 642 | 0.67 |

TABLE 4-continued

| No. | R | Chemical formula (I) Y | Maximum absorption wavelength (nm) | Order parameter |
|---|---|---|---|---|
| 3 | " | —CON(CH₃)—C₆H₅ | 599 | 0.53 |
| 4 | " | —COO—C₆H₄—CH₃ | 642 | 0.72 |
| 5 | " | —COO—C₆H₄—C₃H₇(n) | 642 | 0.73 |
| 6 | " | —COO—C₆H₄—C₄H₉(n) | 642 | 0.74 |
| 7 | " | —COO—C₆H₄—CH(CH₃)(C₂H₅) | 642 | 0.72 |
| 8 | " | —COO—C₆H₄—C₉H₁₉(n) | 641 | 0.68 |
| 9 | " | —COO—C₆H₄—C₁₈H₃₇(n) | 642 | 0.67 |
| 10 | " | —COO—C₆H₃(CH₃)₂—CH₃ (2,4-dimethyl) | 641 | 0.69 |
| 11 | " | —CONH—C₆H₄—C₄H₉(n) | 612 | 0.69 |
| 12 | " | —CON(CH₃)—C₆H₄—C₄H₉(n) | 599 | 0.54 |
| 13 | " | —CONH—C₆H₄—C₁₂H₂₅(n) | 612 | 0.68 |
| 14 | " | —COS—C₆H₄—C₄H₉(n) | 646 | 0.69 |

TABLE 4-continued

| No. | R | Y | Maximum absorption wavelength (nm) | Order parameter |
|---|---|---|---|---|
| 15 | " | —COS—C₆H₄—C₉H₁₉(n) | 646 | 0.68 |
| 16 | " | —COO—C₆H₄—OCH₃ | 642 | 0.70 |
| 17 | " | —COO—C₆H₄—OC₃H₇(n) | 642 | 0.71 |
| 18 | " | —COO—C₆H₄—OC₆H₁₃(n) | 642 | 0.71 |
| 19 | " | —COO—C₆H₄—OC₁₈H₃₇(n) | 641 | 0.69 |
| 20 | " | —CONH—C₆H₄—OC₂H₅ | 612 | 0.68 |
| 21 | " | —COS—C₆H₄—OC₈H₁₇(n) | 646 | 0.67 |
| 22 | " | —COO—C₆H₄—C₆H₁₁ | 642 | 0.73 |
| 23 | " | —COO—C₆H₄—C₆H₁₀—C₅H₁₁ | 646 | 0.73 |
| 24 | " | —COO—C₆H₄—C₆H₅ | 646 | 0.74 |
| 25 | " | —COO—C₆H₄—C₆H₄—C₄H₉(n) | 646 | 0.75 |
| 26 | " | —COO—C₆H₄—C₆H₄—OC₈H₁₇(n) | 646 | 0.72 |
| 27 | " | —COO—C₆H₄—C₆H₄—OC₁₈H₃₇(n) | 646 | 0.71 |

TABLE 4-continued
| No. | R | Chemical formula (I)<br>Y | Maximum absorption wavelength (nm) | Order parameter |
|---|---|---|---|---|
| 28 | " | 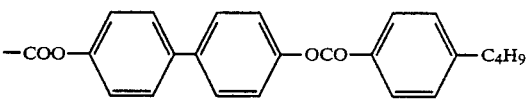 | 646 | 0.71 |
| 29 | " | 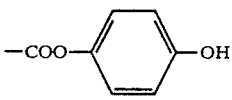 | 642 | 0.70 |
| 30 | " |  | 644 | 0.71 |
| 31 | " | 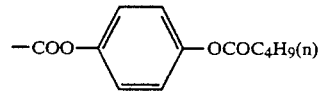 | 644 | 0.72 |
| 32 | " | 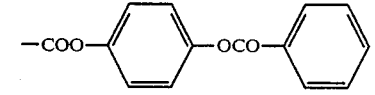 | 644 | 0.74 |
| 33 | " | 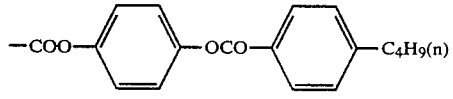 | 644 | 0.74 |
| 34 | " | 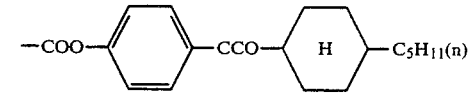 | 644 | 0.75 |
| 35 | " | 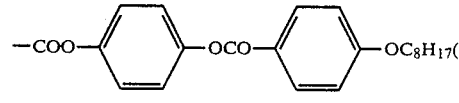 | 644 | 0.73 |
| 36 | " | 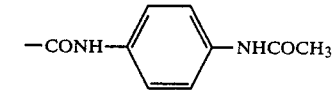 | 639 | 0.67 |
| 37 | " | 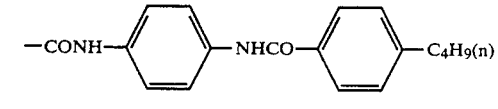 | 639 | 0.69 |
| 38 | " | 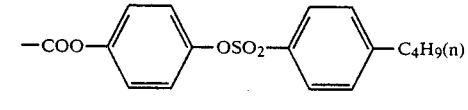 | 642 | 0.70 |
| 39 | " | 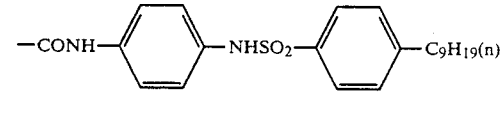 | 639 | 0.69 |
| 40 | " | 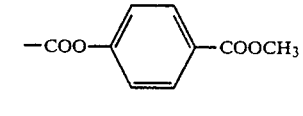 | 642 | 0.70 |

TABLE 4-continued
| No. | R | Y | Maximum absorption wavelength (nm) | Order parameter |
|---|---|---|---|---|
| 41 | " | 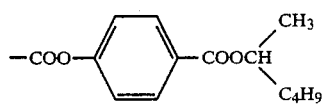 —COO—C$_6$H$_4$—COOCH(CH$_3$)C$_4$H$_9$ | 643 | 0.71 |
| 42 | " | 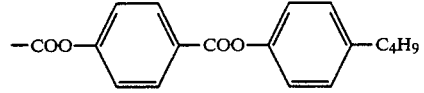 —COO—C$_6$H$_4$—COO—C$_6$H$_4$—C$_4$H$_9$ | 642 | 0.73 |
| 43 | " | 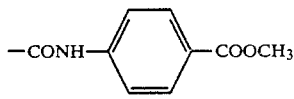 —CONH—C$_6$H$_4$—COOCH$_3$ | 639 | 0.70 |
| 44 | " | 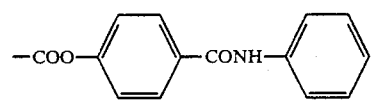 —COO—C$_6$H$_4$—CONH—C$_6$H$_5$ | 642 | 0.68 |
| 45 | " | 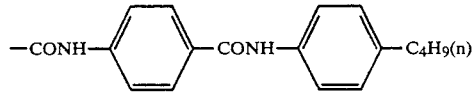 —CONH—C$_6$H$_4$—CONH—C$_6$H$_4$—C$_4$H$_9$(n) | 639 | 0.68 |
| 46 | " | 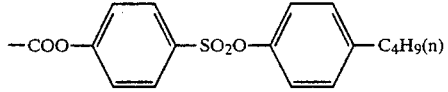 —COO—C$_6$H$_4$—SO$_2$O—C$_6$H$_4$—C$_4$H$_9$(n) | 642 | 0.69 |
| 47 | " | 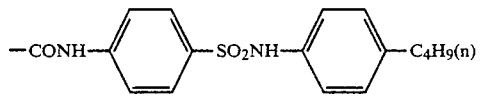 —CONH—C$_6$H$_4$—SO$_2$NH—C$_6$H$_4$—C$_4$H$_9$(n) | 639 | 0.68 |
| 48 | " | 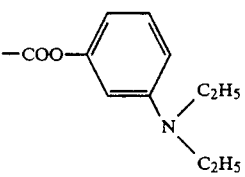 —COO—C$_6$H$_4$—N(C$_2$H$_5$)$_2$ | 642 | 0.71 |
| 49 | " | 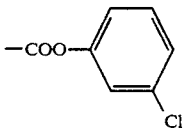 —COO—C$_6$H$_4$—Cl | 642 | 0.66 |
| 50 | " | 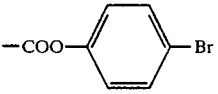 —COO—C$_6$H$_4$—Br | 644 | 0.73 |
| 51 | " | 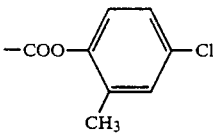 —COO—C$_6$H$_3$(Cl)(CH$_3$) | 643 | 0.70 |

TABLE 4-continued

| No. | Chemical formula (I) R | Y | Maximum absorption wavelength (nm) | Order parameter |
|---|---|---|---|---|
| 52 | " | —COO—⟨ph⟩—NO$_2$ | 643 | 0.71 |
| 53 | " | —COO—⟨ph⟩—CN | 643 | 0.72 |

EXAMPLE 10

The spectroscopic characteristics of a liquid crystal device in which a liquid crystal composition (prepared by adding 7% by weight of 4-(2-methylbutyl)-4'-cyanobiphenyl to ZLI-1132) containing 4.7% by weight of the dye of No. 6 in Table 4 had been sealed were measured just as in Example 9. The results are shown in FIG. 10.

The maximum absorption wavelength and the order parameter of the dye in this Example in the liquid crystal were 642 nm and 0.74, respectively.

Figure 11:
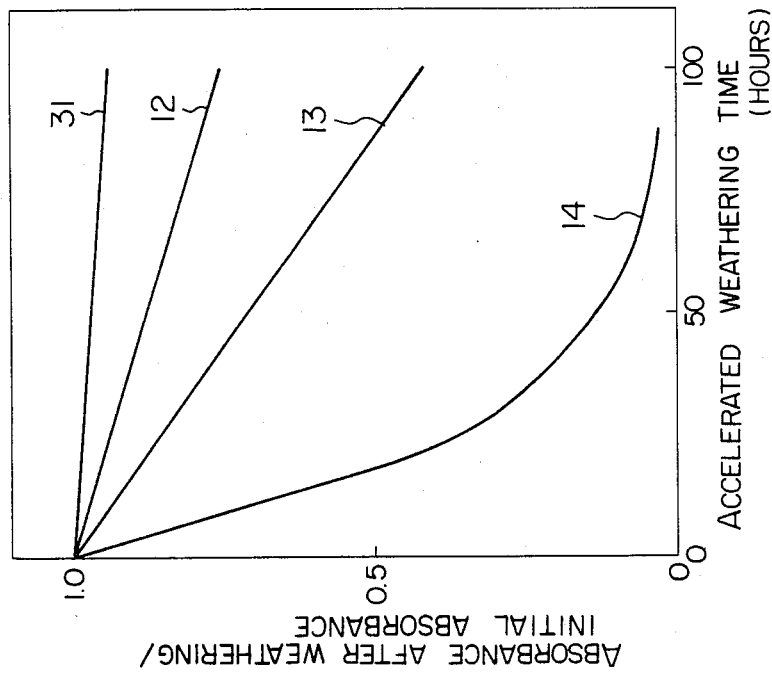

The accelerated weathering test by means of the sunshine weather meter was carried out. The results thereof are shown in FIG. 11.

The percentage of change in the absorbance of the device in which the dye in this Example was used is shown by the curve 31, and said dye is very stable as compared with the conventional dyes shown in the curves 12, 13 and 14.

EXAMPLE 11

Figure 12:
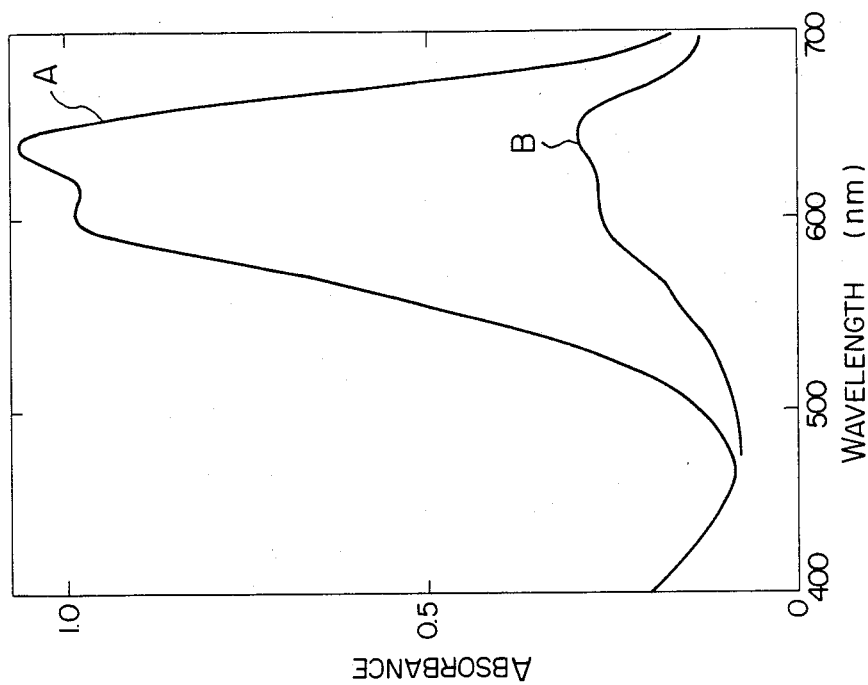

The spectroscopic characteristics of a liquid crystal composition (the same liquid crystal mixture as used in Example 10) containing 3% by weight of the dye of No. 7 in Table 4 were measured just as in Example 9. The results are shown in FIG. 12. The maximum absorption wavelength of said dye was 642 nm and the order parameter thereof was 0.72.

As the result of the accelerated weathering test by means of the sunshine weather meter, the percentage of decreace in the absorbance of the liquid crystal composition was 10% or less 100 hours after the accelerated weathering.

EXAMPLE 12

Figure 13:
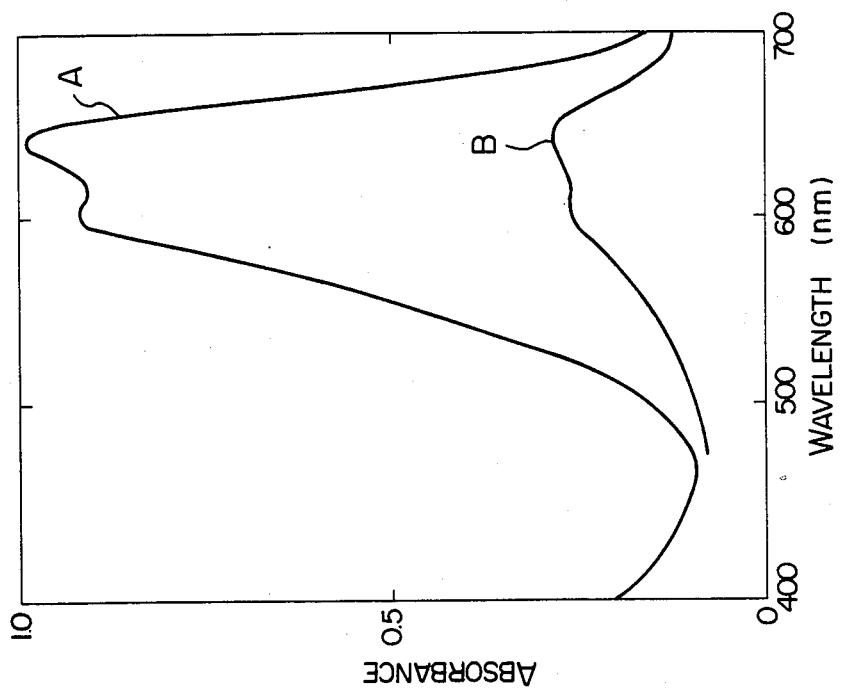

The spectroscopic characteristics of a liquid crystal composition (the same liquid crystal mixture as used in Example 10) containing 1% by weight of the dye of No. 37 in Table 4 were measured just as in Example 9. The results are shown in FIG. 13. The maximum absorption wavelength of said dye was 639 nm, and the order parameter thereof was 0.69. The percentage of decrease in the absorbance according to the accelerated weathering test was 10% or less.

EXAMPLE 13

Figure 14:
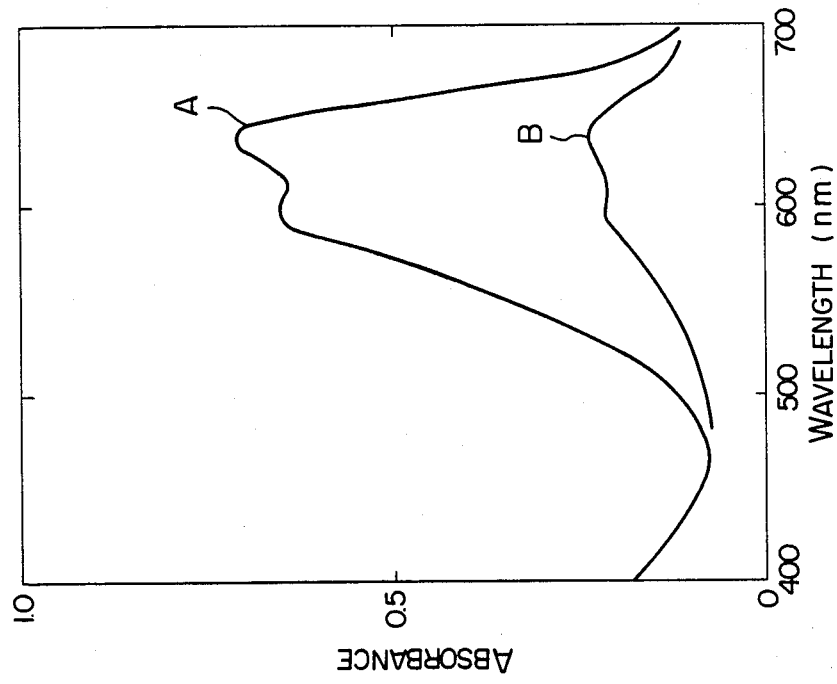

The spectroscopic characteristics of a liquid crystal composition (the same liquid crystal mixture as used in Example 10) containing 3% by weight of the dye of No. 48 in Table 4 are shown in FIG. 14, just as in Example 9. The maximum absorption wavelength of said dye was 642 nm, and the order parameter thereof was 0.71. The percentage of decrease in the absorbance according to the accelerated weathering test was 10% or less.

EXAMPLE 14

In a device having a gap of almost 10 μm which had been subjected to homogeneous orientation treatment was sealed a liquid crystal composition prepared by adding 2% by weight of the dye of No. 6 in Table 4 to a nematic liquid crystal (E-7, trade name, manufactured by BDH Co., Ltd, Great Britain) having positive dielectric anisotropy which was a mixture of the following four compounds:

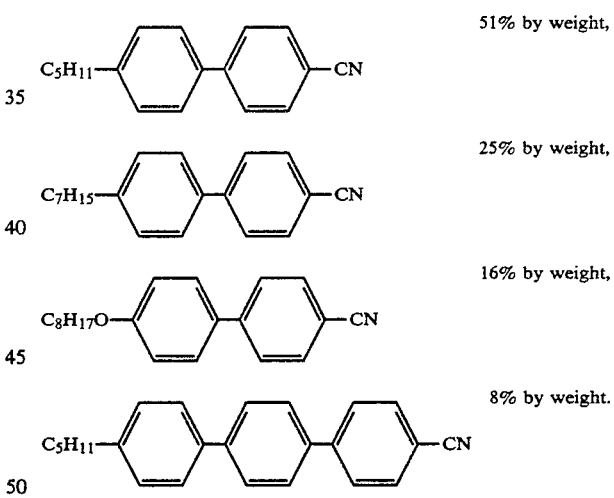

$C_5H_{11}$—⟨ph⟩—⟨ph⟩—CN  51% by weight, $C_7H_{15}$—⟨ph⟩—⟨ph⟩—CN  25% by weight, $C_8H_{17}O$—⟨ph⟩—⟨ph⟩—CN  16% by weight, $C_5H_{11}$—⟨ph⟩—⟨ph⟩—⟨ph⟩—CN  8% by weight.

Figure 16:
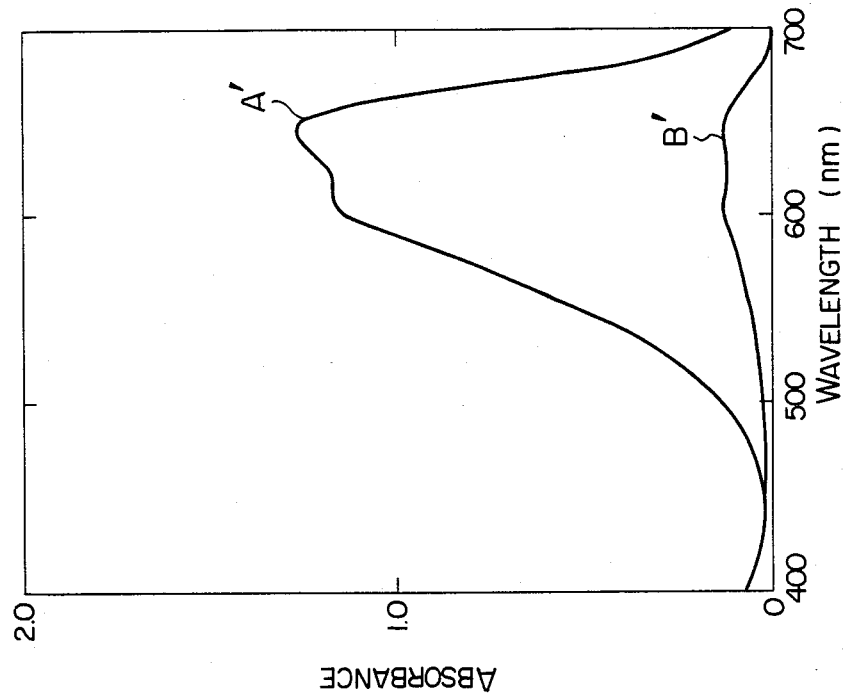
Figure 15A:
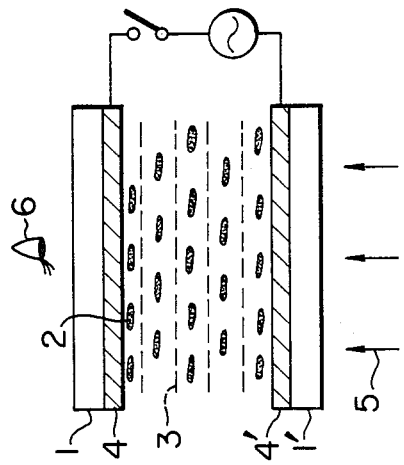
Figure 15B:
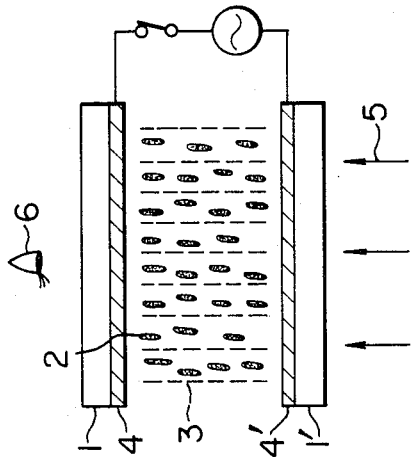

In such a device, when no voltage is applied, the liquid crystal molecules and the pleochroic dye molecules have such a homogeneous orientation that the molecules shown in FIG. 15(a) were aligned in a definite direction. On the other hand, when a voltage is applied, the liquid crystal molecules and the pleochroic dye molecules are aligned as shown in FIG. 15(b). In FIG. 16 are shown the spectroscopic characteristics A' and B' with respect to a light polarized parallel to and that polarized perpendicularly to the orientation direction of the liquid crystal molecules, respectively. The maximum absorption wavelength of said dye was 642 nm, and the order parameter thereof was 0.74.

EXAMPLE 15

Figure 17:
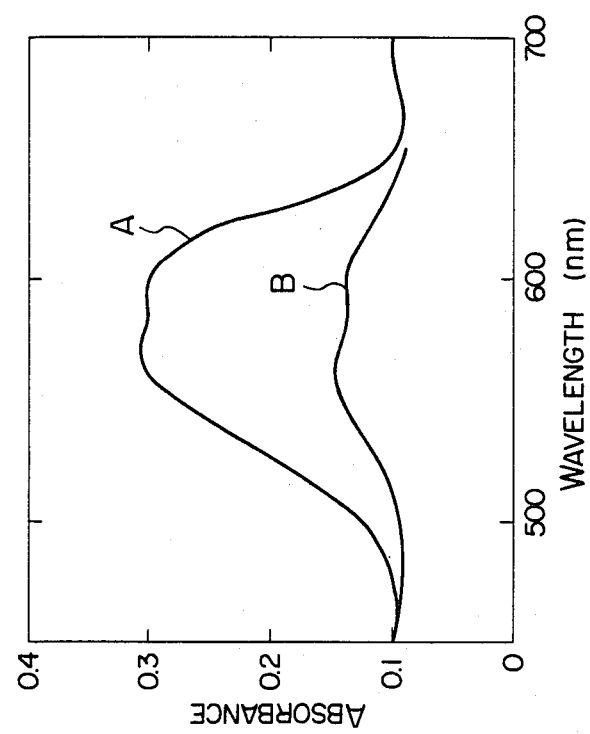

To a mixed liquid crystal (E-9, trade name, manufactured by BDH Co., Ltd.) comprising the following four compounds:

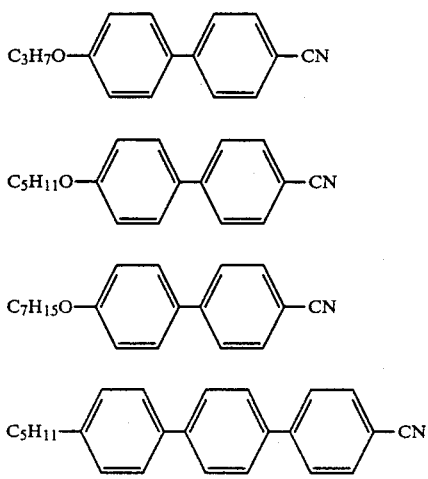

was added 2% by weight of the dye of No. 6 in Table 4, and the resulting liquid crystal composition was made to have homogeneous orientation, just as in Example 14. The spectroscopic characteristics of said liquid crystal composition are shown in FIG. 17. The maximum absorption wavelength of said dye was 642 nm, and the order parameter thereof was 0.75.

EXAMPLE 16

A liquid crystal composition prepared by adding 2.1% by weight of the dye of No. 6 in Table 4 to a mixed liquid crystal (TN-101, trade name, manufactured by Hoffman la Roche Co., Ltd., Switzerland) comprising the following four compounds:

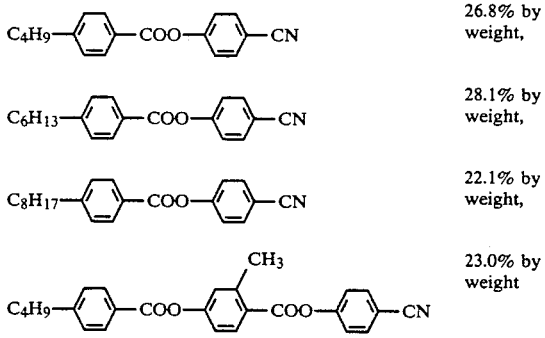

was made to have a homogeneous orientation just as in Example 14.

The maximum absorption wavelength of said dye was 641 nm, and the order parameter thereof was 0.66.

EXAMPLE 17

A liquid crystal composition prepared by adding 1.8% by weight of the dye of No. 6 in Table 4 to a mixed liquid crystal comprising of the following four compounds:

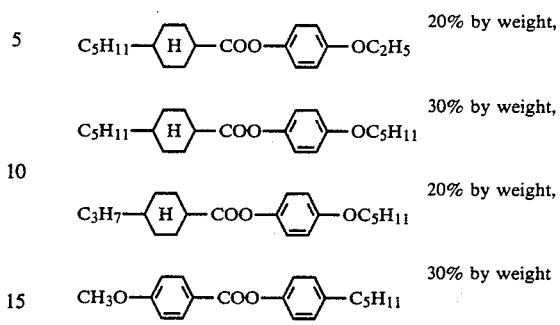

was made to have a homogeneous orientation, just as in Example 14.

The maximum absorption wavelength of said dye was 641 nm, and the order parameter thereof was 0.67.

EXAMPLE 18

To a mixed liquid crystal (NP-5, trade name, manufactured by Merck Co., Ltd., West Germany) comprising the following two compounds:

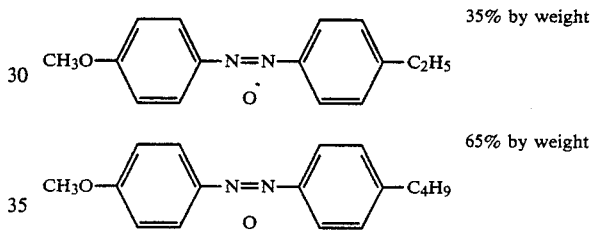

was added 2.2% by weight of the dye of No. 6 in Table 4, and the resulting liquid crystal composition was made to have a homogeneous orientation, just as in Example 14.

The maximum absorption wavelength of said dye was 641 nm, and the order parameter thereof was 0.54.

EXAMPLE 19

To a nematic liquid crystal (EN-18, trade name, manufactured by Chisso Co., Ltd., Japan) having negative dielectric anisotropy was added 1.9% by weight of the dye of No. 6 in Table 4, and the resulting liquid crystal composition was made to have a homogeneous orientation, just as in Example 14. The maximum absorption wavelength of said dye was 642 nm, and the order parameter thereof was 0.68.

EXAMPLE 20

The maximum absorption wavelength and the order parameter of each of the dyes shown in Table 5 were measured in the same manner as in Example 1.

TABLE 5

| No. | Chemical formula (I) R | Y | Maximum absorption wavelength (nm) | Order parameter |
|---|---|---|---|---|
| 1 | OH | —COOC$_3$H$_7$(n) | 570 | 0.61 |
| 2 | " | —COOC$_4$H$_9$(n) | 566 | 0.60 |
| 3 | " | —COOC$_4$H$_9$(i) | 566 | 0.59 |
| 4 | " | —COOC$_8$H$_{17}$(n) | 570 | 0.61 |

TABLE 5-continued

| No. | R | Chemical formula (I) Y | Maximum absorption wavelength (nm) | Order parameter |
|---|---|---|---|---|
| 5 | " | —COSC$_8$H$_{17}$(n) | 576 | 0.64 |
| 6 | " | —COOCH$_2$CH(C$_2$H$_5$)(C$_4$H$_9$(n)) | 570 | 0.57 |
| 7 | " | —COOC$_{18}$H$_{37}$(n) | 570 | 0.62 |
| 8 | " | —COSC$_{18}$H$_{37}$(n) | 576 | 0.66 |
| 9 | " | —COO—(cyclohexyl) | 567 | 0.64 |
| 10 | " | —COS—(cyclohexyl) | 576 | 0.67 |
| 11 | " | —COO—(cyclohexyl)—C$_4$H$_9$ | 568 | 0.65 |
| 12 | " | —COO—(cyclohexyl)—C$_9$H$_{19}$ | 568 | 0.65 |
| 13 | " | —COO—(bicyclohexyl) | 568 | 0.68 |
| 14 | " | —COOCH$_2$—(phenyl)—C$_4$H$_9$(n) | 570 | 0.53 |
| 15 | " | —COOCH$_2$—(phenyl)—OC$_4$H$_9$(n) | 570 | 0.55 |
| 16 | " | —COOC$_2$H$_4$—(cyclohexyl) | 570 | 0.54 |
| 17 | " | —COOC$_2$H$_4$OC$_2$H$_5$ | 570 | 0.61 |
| 18 | " | —COOC$_2$H$_4$OH | 570 | 0.59 |
| 19 | " | —COSC$_2$H$_4$OH | 570 | 0.61 |
| 20 | " | —COOC$_2$H$_4$N(CH$_3$)(CH$_3$) | 570 | 0.56 |
| 21 | " | —COOC$_2$H$_4$O—(phenyl) | 570 | 0.59 |

TABLE 5-continued

| No. | R | Y | Maximum absorption wavelength (nm) | Order parameter |
|---|---|---|---|---|
| 22 | " | 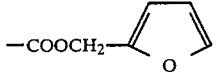 —COOCH$_2$—furan | 570 | 0.54 |
| 23 | " | 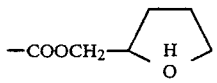 —COOCH$_2$—tetrahydrofuran (H, O) | 570 | 0.60 |
| 24 | " | 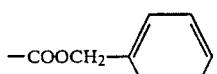 —COOCH$_2$—pyridine | 570 | 0.50 |
| 25 | " | 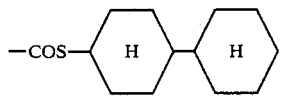 —COS—cyclohexyl-cyclohexyl (H, H) | 576 | 0.68 |
| 26 | " | 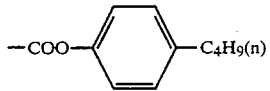 —COO—C$_6$H$_4$—C$_4$H$_9$(n) | 570 | 0.63 |
| 27 | " | 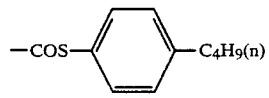 —COS—C$_6$H$_4$—C$_4$H$_9$(n) | 576 | 0.61 |
| 28 | " | 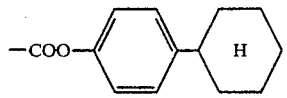 —COO—C$_6$H$_4$—cyclohexyl (H) | 570 | 0.62 |
| 29 | " | 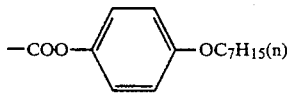 —COO—C$_6$H$_4$—OC$_7$H$_{15}$(n) | 570 | 0.60 |
| 30 | " |  —COO—C$_6$H$_4$—C$_6$H$_5$ | 570 | 0.63 |
| 31 | " | 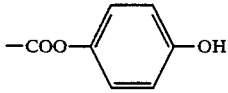 —COO—C$_6$H$_4$—OH | 570 | 0.59 |
| 32 | " | 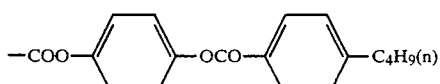 —COO—C$_6$H$_4$—OCO—C$_6$H$_4$—C$_4$H$_9$(n) | 570 | 0.63 |
| 33 | " | 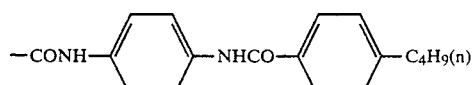 —CONH—C$_6$H$_4$—NHCO—C$_6$H$_4$—C$_4$H$_9$(n) | 564 | 0.59 |
| 34 | " | 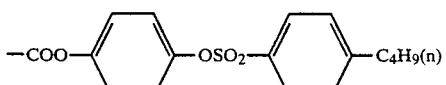 —COO—C$_6$H$_4$—OSO$_2$—C$_6$H$_4$—C$_4$H$_9$(n) | 569 | 0.60 |

TABLE 5-continued

| No. | Chemical formula (I) R | Y | Maximum absorption wavelength (nm) | Order parameter |
|---|---|---|---|---|
| 35 | " | —CONH—⟨C₆H₄⟩—NHSO₂—⟨C₆H₄⟩—C₉H₁₉(n) | 564 | 0.58 |
| 36 | " | —COO—⟨C₆H₄⟩—COO—⟨C₆H₄⟩—C₄H₉(n) | 570 | 0.62 |
| 37 | " | —COO—⟨C₆H₄⟩—SO₂O—⟨C₆H₄⟩—C₄H₉(n) | 570 | 0.58 |
| 38 | " | —COO—⟨C₆H₄⟩—N(C₂H₅)₂ | 570 | 0.60 |
| 39 | " | —COO—⟨C₆H₄⟩—Cl | 570 | 0.63 |
| 40 | " | —COO—⟨C₆H₄⟩—NO₂ | 570 | 0.61 |
| 41 | " | —COO—⟨C₆H₄⟩—CN | 5760 | 0.62 |

EXAMPLE 21

Figure 18:
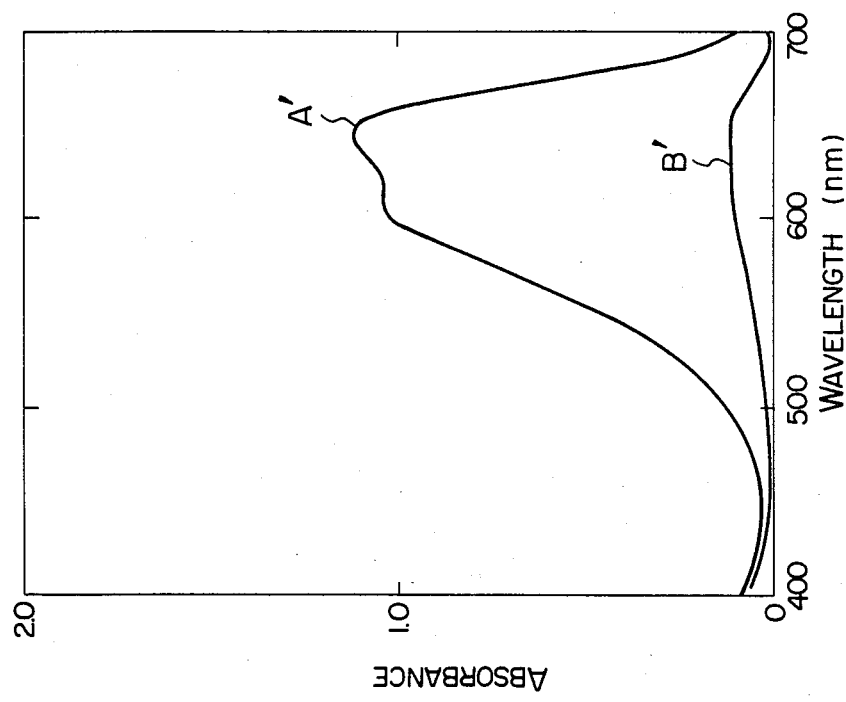
Figure 19:
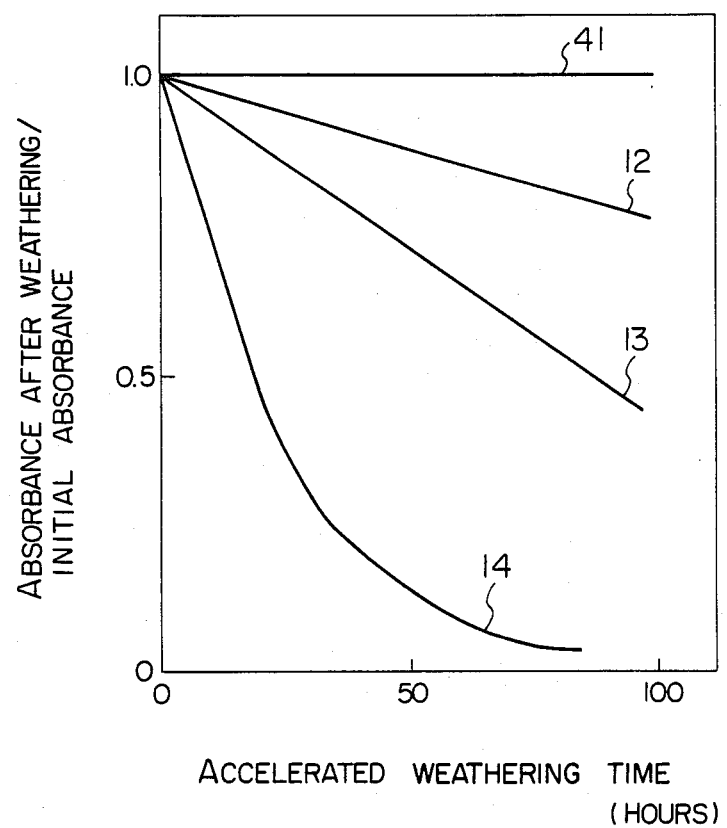

The spectroscopic characteristics of a liquid crystal composition prepared by adding 1% by weight of the dye of No. 4 in Table 5 to the same liquid crystals (ZLI-1132) as used in Example 1, are shown in FIG. 18. The results of the accelerated weathering test carried out in the same manner as in Example 2 are shown in FIG. 19. As is clear from FIG. 19, the dye of this Example (the curve 41) is very stable as compared with the conventional dyes.

What is claimed is:

1. In a liquid crystal composition comprising at least one host liquid crystal and at least one pleochroic dye dissolved as a guest in said at least one host liquid crystal, said host liquid crystal being a nematic liquid crystal, wherein said at least one pleochroic dye includes at least one anthraquinone dye represented by the formula:

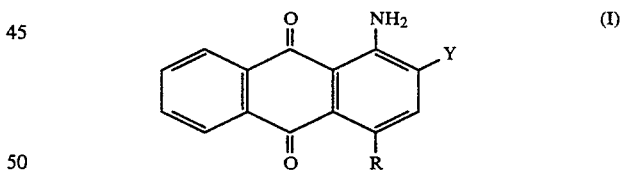

wherein R is OH or NH₂, provided that (a) when R is OH, Y is selected from the group consisting of COXR' in which X is an oxygen atom, and R' is a cycloalkyl group or an aryl group each having one or more substituents, and (b) when R is NH₂, Y is COXR' in which X and R' are as defined above, and wherein said substituents have 1 to 18 carbon atoms when R is OH, and 1 to 24 carbon atoms when R is NH₂.

2. A liquid crystal composition according to claim 1, wherein the liquid crystal contains an optically active substance to convert the nematic state of the nematic liquid crystal into a cholesteric state.

3. A liquid crystal composition according to claim 2, wherein the optically active substance is a chiral nematic compound.

4. In a liquid crystal composition comprising at least one host liquid crystal and at least one pleochroic dye dissolved as a guest in said at least one host liquid crystal, said host liquid crystal being a nematic liquid crystal, wherein said at least one pleochroic dye includes at least one anthraquinone dye represented by the formula:

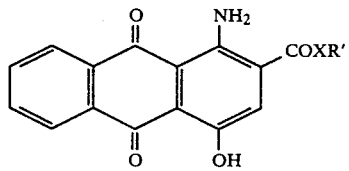

(III)

wherein X is an oxygen atom, and R' is a cycloalkyl group or an aryl group each having one or more substituents, each of said substituents having 1 to 18 carbon atoms.

5. A liquid crystal composition according to claim 4, wherein the liquid crystal contains an optically active substance to convert the nematic state of the nematic liquid crystal to a cholesteric state.

6. In a liquid crystal composition comprising at least one host liquid crystal and at least one pleochroic dye dissolved as a guest in said at least one host liquid crystal, said host liquid crystal being a nematic liquid crystal, wherein said at least one pleochroic dye includes at least one anthraquinone dye represented by the formula:

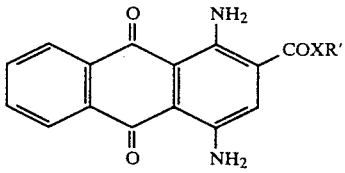

(IV)

wherein X is an oxygen atom, and R' is a cycloalkyl group or an aryl group each having one or more substituents, each of said substituents having 1 to 24 carbon atoms.

7. A liquid crystal composition according to claim 6, wherein the liquid crystal contains an optically active substance to convert the nematic state of the nematic liquid crystal into a cholesteric state.

8. A liquid crystal display device comprising a pair of base plates at least one of which is transparent, transparent electrodes for driving the liquid crystal formed on the opposite surface of said base plates facing each other, a liquid crystal layer held between said plates via the transparent electrodes, and a means for applying an electric field for driving the liquid crystal via the aforesaid transparent electrodes, characterized in that the aforesaid liquid crystal layer comprises at least one host liquid crystal and at least one pleochroic dye dissolved as a guest in said at least one host liquid crystal, said host liquid crystal being a nematic liquid crystal, wherein said at least one pleochroic dye includes at least one anthraquinone dye represented by the formula:

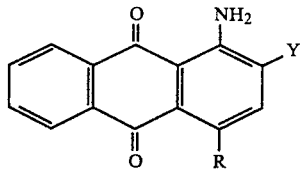

wherein R is OH or $NH_2$, provided that (a) when R is OH, Y is selected from the group consisting of COXR' in which X is an oxygen atom, and R' is a cycloalkyl group or an aryl group each having one or more substituents, and (b) when R is $NH_2$, Y is COXR' in which X and R' are as defined above, and wherein said substituents have 1 to 18 carbon atoms when R is OH, and 1 to 24 carbon atoms when R is $NH_2$.

9. A liquid crystal display device according to claim 8, wherein the liquid crystal contains an optically active substance to convert the nematic state of the nematic liquid crystal into a cholesteric state.

10. A liquid crystal composition according to claim 6, wherein COXR' is

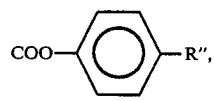

wherein R'' is said substituent.

11. A liquid crystal composition according to claim 6, wherein COXR' is

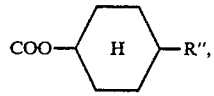

wherein R'' is said substituent.

12. A liquid crystal composition according to claim 1, wherein R' is a cyclohexyl group having a substituent, said substituent being selected from the group consisting of an alkyl group, a cyclohexyl group, and an alkylcyclohexyl group.

13. A liquid crystal composition according to claim 1, wherein R' is an aryl group having a substituent, and wherein said substituent is a phenyl group, an alkylphenyl group, an alkoxyphenyl group, an alkyl group, an alkoxy group, a cycloalkyl group, an alkylcyclohexyl group, an acyloxy group, an acylamino group, a sulfonyloxy group, a sulfonamide group, a group of a carboxylic acid ester, a carbamoyl group, a group of a sulfonic acid ester, a sulfamoyl group, a dialkylamino group, or a cyano group.

14. A liquid crystal composition according to claim 13, wherein said aryl group having a substituent is a phenyl group having a substituent.

15. A liquid crystal composition according to claim 1, wherein said at least one pleochroic dye is contained in said at least one host liquid crystal in an amount of at least 0.1% by weight based on the weight of said host liquid crystal.

16. A liquid crystal composition according to claim 1, wherein said at least one anthraquinone dye comprises:

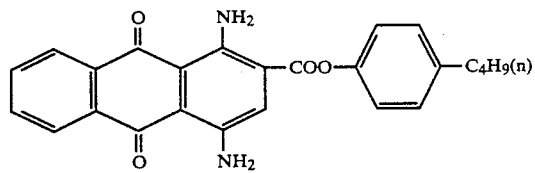
17. A liquid crystal display device according to claim 8, wherein said at least one anthraquinone dye comprises:
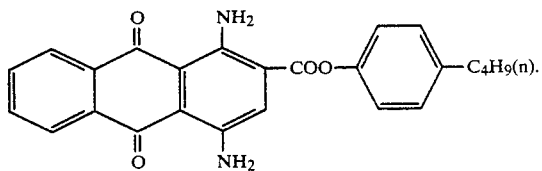
* * * * *